(12) United States Patent
Takeuchi et al.

(10) Patent No.: US 12,054,143 B2
(45) Date of Patent: Aug. 6, 2024

(54) DROP-OFF ASSIST DEVICE

(71) Applicants: TOYOTA JIDOSHA KABUSHIKI KAISHA, Toyota (JP); Continental Automotive GmbH, Hannover (DE)

(72) Inventors: Koji Takeuchi, Toyota (JP); Masanori Tokuda, Miyoshi (JP); Masaho Ishida, Toyota (JP); Junya Fukuta, Nagoya (JP); Ryuichi Soya, Yokohama (JP)

(73) Assignees: TOYOTA JIDOSHA KABUSHIKI KAISHA, Toyota (JP); Continental Automotive GmbH, Hanover (DE)

( * ) Notice: Subject to any disclaimer, the term of this patent is extended or adjusted under 35 U.S.C. 154(b) by 268 days.

(21) Appl. No.: 17/702,075

(22) Filed: Mar. 23, 2022

(65) Prior Publication Data
US 2022/0306096 A1 Sep. 29, 2022

(30) Foreign Application Priority Data
Mar. 25, 2021 (JP) .................... 2021-052164

(51) Int. Cl.
*B60W 30/095* (2012.01)
*B60W 30/10* (2006.01)

(52) U.S. Cl.
CPC ........ *B60W 30/0956* (2013.01); *B60W 30/10* (2013.01); *B60W 2420/403* (2013.01); *B60W 2554/4049* (2020.02)

(58) Field of Classification Search
CPC ..... B60W 30/0956; B60W 2554/4049; B60W 30/16
USPC ......................................... 701/301
See application file for complete search history.

(56) References Cited

U.S. PATENT DOCUMENTS

| 5,754,099 A * | 5/1998 | Nishimura ........... G05D 1/0289 342/70 |
| 9,475,491 B1 * | 10/2016 | Nagasaka ............. B60W 30/16 |
| 10,086,833 B1 | 10/2018 | Duan et al. |
| 10,457,165 B2 * | 10/2019 | Toyoda .............. B60N 2/02246 |
| 11,085,213 B2 * | 8/2021 | Goriesky ............... B60Q 5/006 |
| 2007/0188312 A1 | 8/2007 | Bihler et al. |

(Continued)

FOREIGN PATENT DOCUMENTS

| EP | 2571004 A1 * | 3/2013 | ...... B60W 30/18163 |
| EP | 2994358 B1 * | 12/2017 | ......... B60K 31/0008 |

(Continued)

*Primary Examiner* — Tuan C To
(74) *Attorney, Agent, or Firm* — Sughrue Mion, PLLC

(57) ABSTRACT

A device includes a processor configured to: issue an alarm when a movement path condition is met and a prohibition condition is not met, the movement path condition being met when an approaching object of which a predicted movement path is a path along which the object passes by a door of the host vehicle is present; and not issue the alarm when the prohibition condition is met, even when the movement path condition is met, wherein the prohibition condition includes a condition to be met when a difference between a distance in a transverse direction from the host vehicle to a stationary object and a distance in the transverse direction from the host vehicle to the approaching object is equal to or less than a predetermined value in a case where the stationary object is present, the stationary object being stationary at a side of the host vehicle.

6 Claims, 11 Drawing Sheets

(56) References Cited

U.S. PATENT DOCUMENTS

| | | | |
|---|---|---|---|
| 2012/0154135 A1* | 6/2012 | Tronnier | G08G 1/166 |
| | | | 340/435 |
| 2015/0336574 A1* | 11/2015 | Akiyama | G08G 1/16 |
| | | | 701/301 |
| 2015/0371095 A1* | 12/2015 | Hartmann | H04N 23/635 |
| | | | 348/148 |
| 2019/0299986 A1 | 10/2019 | Saito et al. | |
| 2020/0039510 A1* | 2/2020 | Kume | B60W 30/09 |
| 2021/0166564 A1* | 6/2021 | Takaki | G08G 1/166 |
| 2021/0221363 A1* | 7/2021 | Lai | G08G 1/165 |
| 2021/0287548 A1* | 9/2021 | Lai | B60R 1/025 |
| 2021/0291825 A1* | 9/2021 | Goriesky | B60W 60/0011 |
| 2021/0300358 A1* | 9/2021 | Sherrit | B60Q 9/008 |
| 2021/0339748 A1* | 11/2021 | Spieker | B60W 30/09 |
| 2022/0122460 A1* | 4/2022 | Takaki | B60Q 1/535 |
| 2023/0227030 A1* | 7/2023 | Izumi | B60W 30/18159 |
| | | | 701/45 |

FOREIGN PATENT DOCUMENTS

| | | | |
|---|---|---|---|
| GB | 2510698 A * | 8/2014 | B60W 30/18109 |
| JP | 2007-138457 A | 6/2007 | |
| JP | 2014-149741 A | 8/2014 | |
| JP | 2018-008576 A | 1/2018 | |

* cited by examiner

FIG. 5A
FIG. 5B
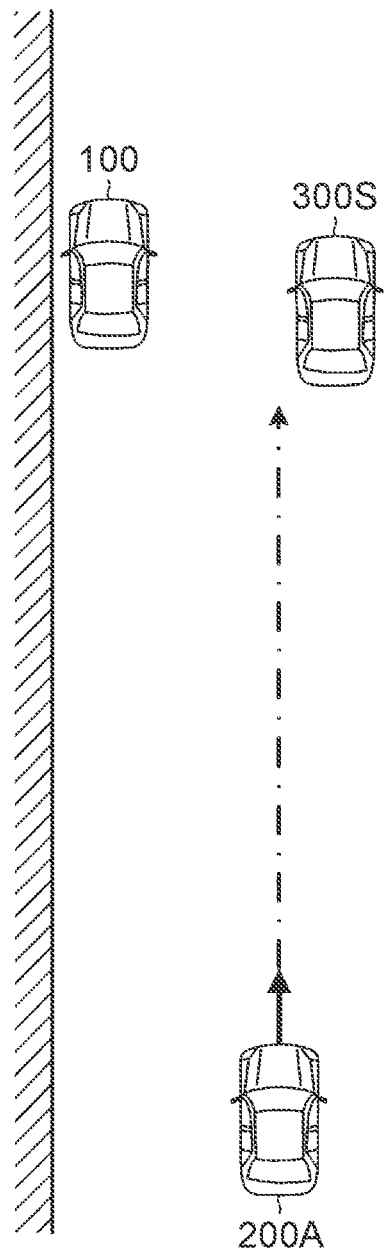
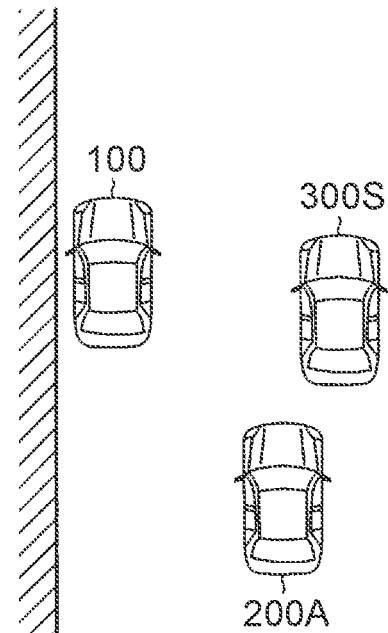

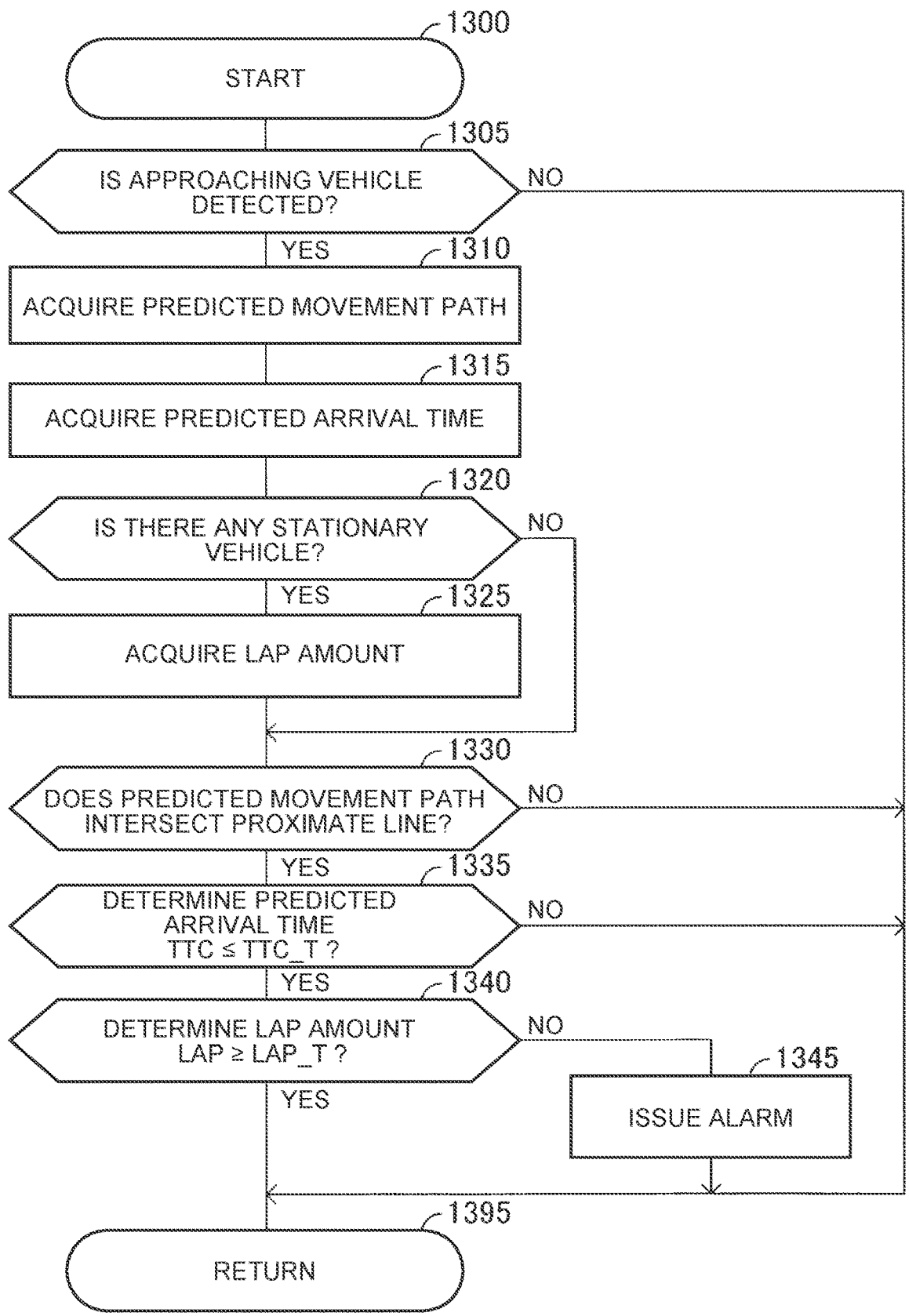

DROP-OFF ASSIST DEVICE

CROSS-REFERENCE TO RELATED APPLICATION

This application claims priority to Japanese Patent Application No. 2021-052164 filed on Mar. 25, 2021, incorporated herein by reference in its entirety.

BACKGROUND

1. Technical Field

The present disclosure relates to a drop-off assist device.

2. Description of Related Art

There is, as a related art, a drop-off assist device that does not allow an occupant from getting off the host vehicle by not allowing the occupant to open a door upon detecting an object that may pass by the host vehicle while the host vehicle is stationary (see Japanese Unexamined Patent Application Publication No. 2007-138457 (JP 2007-138457 A), for example). There is also, as a related art, a drop-off assist device that informs an occupant of the host vehicle of the presence of an object that may pass by the host vehicle by issuing an alarm upon detecting an object that may pass by the host vehicle while the host vehicle is stationary. Such drop-off assist devices can improve the safety of occupants of the host vehicle.

SUMMARY

When there is an object (approaching object) such as a vehicle that is approaching the host vehicle from behind and another object such as a vehicle that is present and stationary at a side of the host vehicle, the approaching object may not be able to pass between the object (stationary object) and the host vehicle and may be stopped before the stationary object, even if a predicted movement path of the approaching object passes by the host vehicle. If an alarm is issued when there is such a possibility, the alarm may be unnecessary.

The present disclosure provides a drop-off assist device that can suppress unnecessary alarms being issued.

A drop-off assist device according to an aspect of the present disclosure includes a processor configured to: issue an alarm when a movement path condition is met and a prohibition condition is not met, the movement path condition being met when an approaching object is present, the approaching object is an object that is approaching a host vehicle and of which a predicted movement path is a path along which the object passes by a door of the host vehicle; and not issue the alarm when the prohibition condition is met, even when the movement path condition is met, wherein the prohibition condition includes a condition to be met when a difference between a distance in a transverse direction from the host vehicle to a stationary object and a distance in the transverse direction from the host vehicle to the approaching object is equal to or less than a predetermined value in a case where the stationary object is present, the stationary object being stationary at a side of the host vehicle.

The approaching object may be stopped before the stationary object when the difference between the distance in the transverse direction from the host vehicle to the stationary object and the distance in the transverse direction from the host vehicle to the approaching object is small. If an alarm is issued when there is such a possibility, the alarm may be unnecessary. In the aspect described above, no alarm is issued when the difference between the distance in the transverse direction from the host vehicle to the stationary object and the distance in the transverse direction from the host vehicle to the approaching object is equal to or less than the predetermined value. Thus, it is possible to suppress unnecessary alarms being issued.

In the aspect described above, the processor may be configured to detect, as the approaching object, the object that is approaching the host vehicle and of which the predicted movement path is a path along which the object passes through an area within a predetermined distance in the transverse direction from the host vehicle.

The approaching object is an element that affects whether the movement path condition is met. Thus, in order to appropriately determine whether the movement path condition is met, the object determined as the approaching object is preferably an object, a predicted movement path of which passes through an area within a certain distance in the transverse direction from the host vehicle. In the configuration described above, an object that is approaching the host vehicle and the predicted movement path of which passes through an area within a predetermined distance in the transverse direction from the host vehicle is detected as the approaching object. Therefore, it is possible to appropriately determine whether the movement path condition is met.

In the aspect described above, the processor may be configured to detect, as the stationary object, an object that is stationary in a predetermined area at the side of the host vehicle.

The stationary object is an element that affects whether the prohibition condition is met. Thus, in order to appropriately determine whether the prohibition condition is met, the object determined as the stationary object is preferably an object that is stationary in a certain area at aside of the host vehicle. In the configuration described above, an object that is stationary in a predetermined area at a side of the host vehicle is detected as the stationary object. Therefore, it is possible to appropriately determine whether the prohibition condition is met.

In the aspect described above, the path condition may include a condition to be met when a time predicted to be taken before the approaching object passes by the door of the host vehicle is equal to or less than a predetermined time.

It is more preferable to issue an alarm when the approaching object has come close to the host vehicle than to issue an alarm when the approaching object is moving at a location far from the host vehicle. In the configuration described above, the movement path condition is met when the time predicted to be taken before the approaching object passes by the door of the host vehicle has become equal to or less than the predetermined time. Therefore, an alarm can be issued appropriately.

The constituent elements according to the present disclosure are not limited to those according to an embodiment of the present disclosure to be discussed later with reference to the drawings. Other features and accompanying advantages of the present disclosure will be easily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A illustrates a scene in which a vehicle (stationary vehicle) is present and stationary at a side of the host vehicle when a vehicle (approaching vehicle) is approaching the host vehicle from behind;

FIG. 5B illustrates a scene in which the approaching vehicle is stopped before the stationary vehicle;

FIG. 13 is a flowchart illustrating a routine executed by the drop-off assist device according to the embodiment of the present disclosure.

DETAILED DESCRIPTION OF EMBODIMENTS

Figure 1:
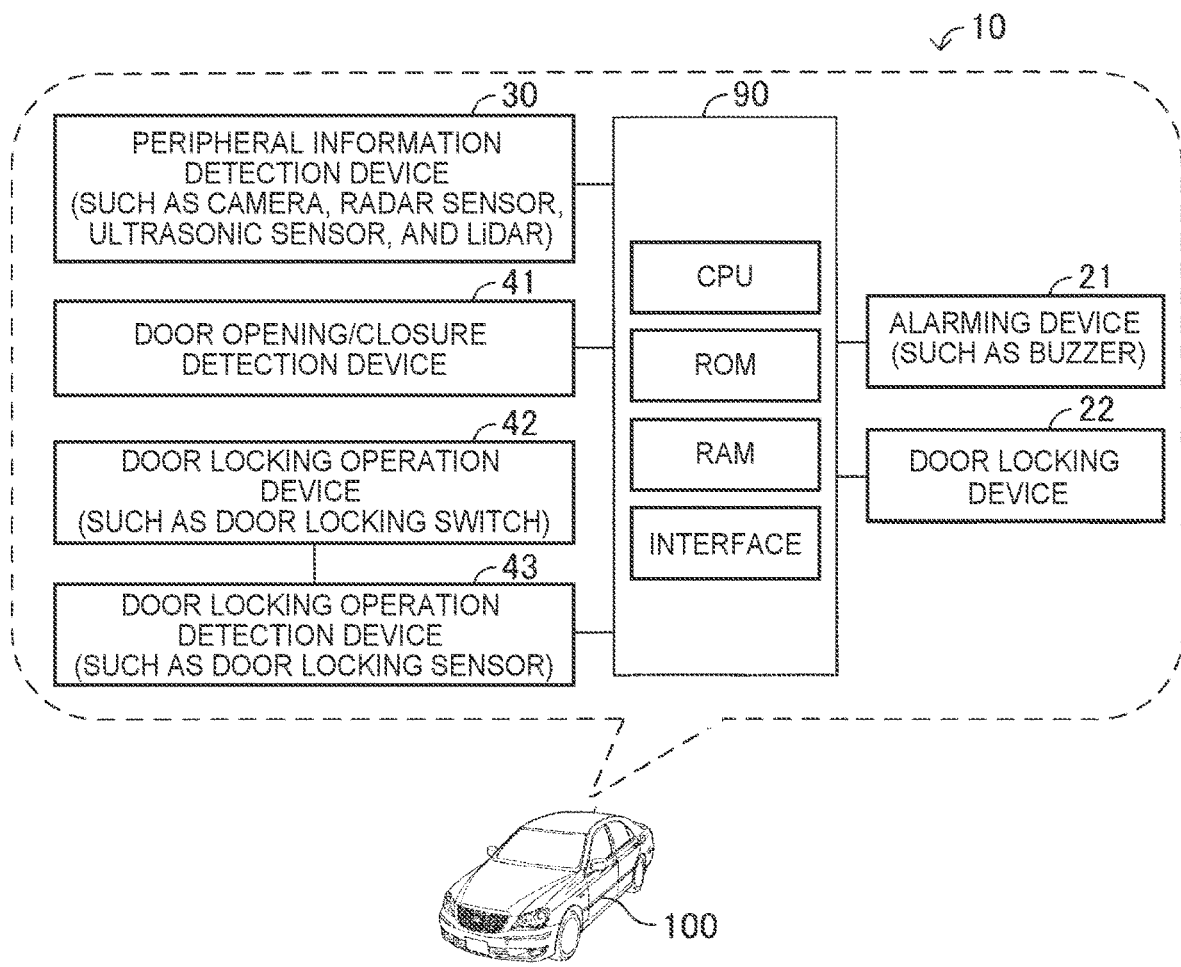
FIG. 1 illustrates a drop-off assist device according to an embodiment of the present disclosure and a vehicle (host vehicle) on which the drop-off assist device is mounted.

A drop-off assist device according to an embodiment of the present disclosure will be described below with reference to the drawings. FIG. 1 illustrates a drop-off assist device 10 according to an embodiment of the present disclosure. The drop-off assist device 10 is mounted on a vehicle (host vehicle 100).

Figure 2:
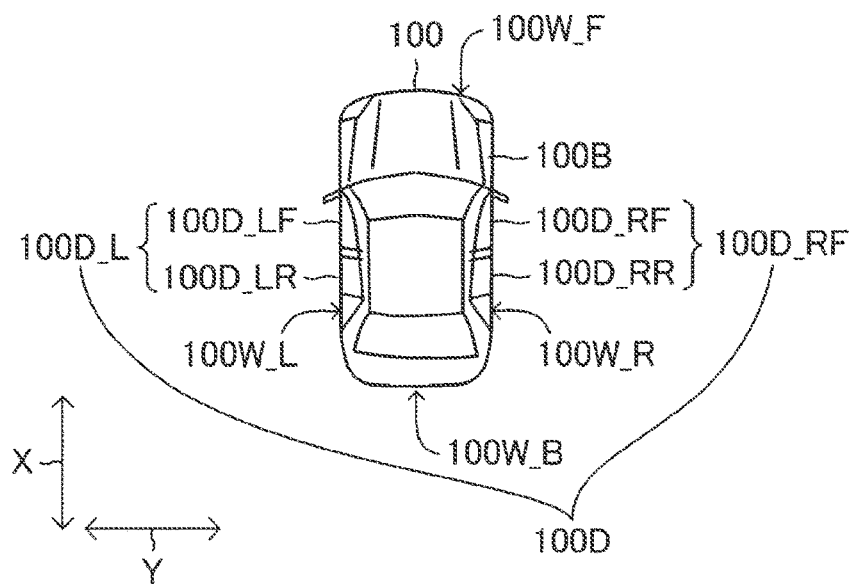
FIG. 2 illustrates the host vehicle.

In the present embodiment, as illustrated in FIG. 2, the host vehicle 100 includes four doors 100D. The four doors 100D include a right front door 100D_RF provided at the right front of the host vehicle 100, a right rear door 100D_RR provided at the right rear of the host vehicle 100, a left front door 100D_LF provided at the left front of the host vehicle 100, and a left rear door 100D_LR provided at the left rear of the host vehicle 100.

In the drawings, reference sign X denotes the longitudinal direction of the host vehicle 100, and reference sign Y denotes the transverse direction of the host vehicle 100. Thus, the longitudinal direction X corresponds to the front-rear direction or the overall length direction of the host vehicle 100, and the transverse direction Y corresponds to the right-left direction or the width direction of the host vehicle 100.

In the present embodiment, the doors 100D are each a swing (pivot) door. Thus, the doors 100D are attached to a vehicle body 100B of the host vehicle 100 so as to be swingable (pivotable) about a pivot axis that extends vertically at the front portion of the doors 100D. One or more of the doors 100D may be a slide (sliding) door.

In the following description, the right front door 100D_RF and the right rear door 100D_RR are each referred to as a "right-side door 100D_R", and the left front door 100D_LF and the left rear door 100D_LR are each referred to as a "left-side door 100D_L".

ECU

The drop-off assist device 10 includes an ECU 90. The term "ECU" is an abbreviation of an electronic control unit. The ECU 90 includes a microcomputer as a main component. The microcomputer includes a central processing unit (CPU), a read only memory (ROM), a random access memory (RAM), a non-volatile memory, an interface, etc. The CPU executes an instruction, a program, or a routine stored in the ROM to implement various functions.

Alarming Device Etc.

An alarming device 21 and a door locking device 22 are mounted on the host vehicle 100.

Alarming Device

The alarming device 21 is a buzzer that outputs various alarming sounds, for example. The alarming device 21 is electrically connected to the ECU 90. The ECU 90 can cause the alarming device 21 to output an alarming sound.

Door Locking Device

The door locking device 22 is a device that locks and unlocks the doors 100D. The door locking device 22 is electrically connected to the ECU 90. The ECU 90 can control operation of the door locking device 22.

Peripheral Information Detection Device Etc.

Further, a peripheral information detection device 30, a door opening/closure detection device 41, a door locking operation device 42, and a door locking operation detection device 43 are mounted on the host vehicle 100.

Peripheral Information Detection Device

The peripheral information detection device 30 is a device that detects information around the host vehicle 100, and includes a camera, a radar sensor (e.g., a millimeter-wave radar), an ultrasonic sensor (clearance sonar), a laser radar (LiDAR), etc.

The peripheral information detection device 30 is electrically connected to the ECU 90. The peripheral information detection device 30 detects information around the host vehicle 100, and transmits the detected information to the ECU 90. The ECU 90 detects an object etc. that is present around the host vehicle 100 based on the information (peripheral information I_S), and can acquire information about the object etc. In other words, the peripheral information detection device 30 detects an object that is present around the host vehicle 100 and transmits information about the detected object to the ECU 90, and the ECU 90 can acquire information (object information I_O) about the object that is present around the host vehicle 100 based on the information. In the embodiment, the object to be detected by the peripheral information detection device 30 may be another vehicle, a motorcycle, a bicycle, a pedestrian, etc.

Door Opening/Closure Detection Device

The door opening/closure detection device 41 is a device that detects whether the doors 100D are open or closed. The door opening/closure detection device 41 is electrically connected to the ECU 90. The door opening/closure detection device 41 detects whether the doors 100D are open or closed, and transmits information about the detection results to the ECU 90. The ECU 90 can recognize whether the doors 100D are open or closed based on such information.

Door Locking Operation Device

The door locking operation device 42 is a device that locks and unlocks the doors 100D, and may be a door locking switch to be operated by an occupant of the host vehicle 100 or a door locking sensor that detects an operation performed on the door locking operation device 42, for example.

The door locking operation device 42 is electrically connected to the door locking operation detection device 43. The door locking operation detection device 43 is electrically connected to the ECU 90. The door locking operation detection device 43 detects an operation performed on the door locking operation device 42, and transmits information about the detected operation to the ECU 90. The ECU 90 locks and unlocks the doors 100D by actuating the door locking device 22 in accordance with the information. Thus, an occupant of the host vehicle 100 can lock and unlock the doors 100D using the door locking device 22 by operating the door locking operation device 42.

Overview of Operation of Drop-Off Assist Device

Next, an overview of operation of the drop-off assist device 10 will be described.

While operation of the drop-off assist device 10 at the time when the object that is approaching the host vehicle 100 is a vehicle that is approaching the host vehicle 100 from behind will be described below, the drop-off assist device 10 operates similarly also when the object that is approaching the host vehicle 100 is a vehicle that is approaching the host vehicle 100 from ahead. In addition, while operation of the drop-off assist device 10 at the time when the object that is approaching the host vehicle 100 is a vehicle will be described below, the drop-off assist device 10 operates similarly also when the object that is approaching the host vehicle 100 is another object such as a motorcycle, a bicycle, or a pedestrian.

Further, while operation of the drop-off assist device 10 at the time when the object that is stationary at a side of the host vehicle 100 is a vehicle will be described below, the drop-off assist device 10 operates similarly also when the object that is stationary at a side of the host vehicle 100 is another object such as a motorcycle, a bicycle, or a pedestrian.

Figure 3A:
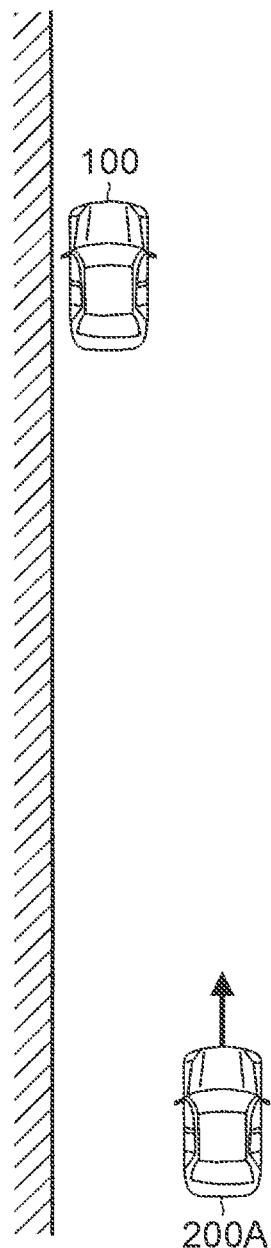
FIG. 3A illustrates a scene in which a vehicle (approaching vehicle) is approaching the host vehicle from behind.
Figure 3B:
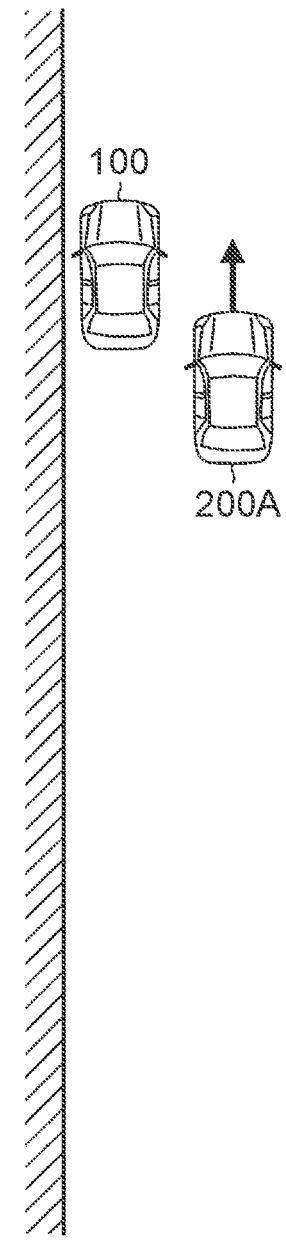
FIG. 3B illustrates a scene in which the approaching vehicle is passing by the host vehicle.

As illustrated in FIG. 3A, there is occasionally a vehicle 200 that is approaching the host vehicle 100, which is stationary, from behind toward the door 100D of the host vehicle 100. The vehicle 200 (approaching vehicle 200A) occasionally passes by the host vehicle 100 as illustrated in FIG. 3B. If the door 100D of the host vehicle 100 is opened at this time, the approaching vehicle 200A may collide against the door 100D. Thus, by issuing an alarm (performing a process of outputting an alarming sound from the alarming device 21) in the case where there is such a possibility, an occupant of the host vehicle 100, including a driver, can be informed that there is a possibility that the approaching vehicle 200A collides against the door 100D, and accordingly it is possible to suppress the possibility of a collision between the approaching vehicle 200A and the door 100D if the occupant refrains from opening the door 100D.

Thus, in order to suppress the possibility of a collision between the approaching vehicle 200A and the door 100D of the host vehicle 100, it is desirable to predict a movement path of the approaching vehicle 200A and issue an alarm when it is determined based on the predicted movement path that there is a possibility that the approaching vehicle 200A passes by the host vehicle 100.

Figure 4A:
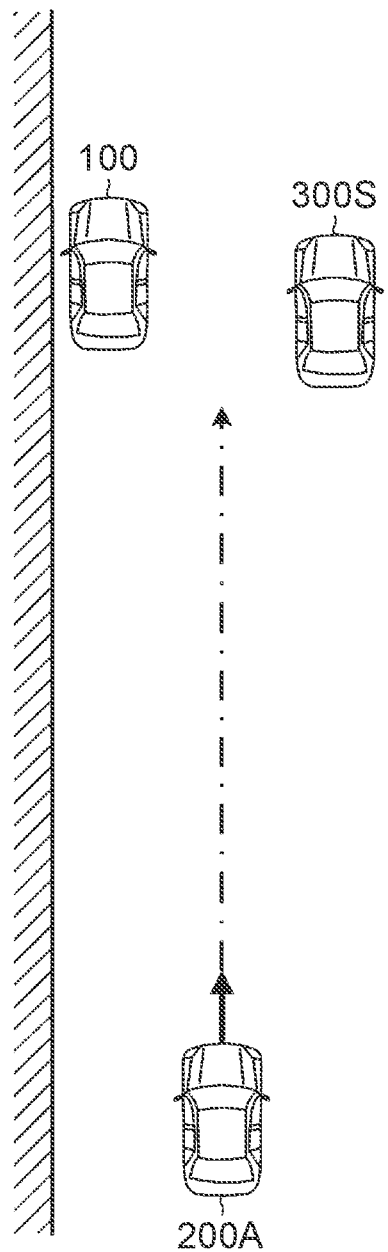
FIG. 4A illustrates a scene in which a vehicle (stationary vehicle) is present and stationary at a side of the host vehicle when a vehicle (approaching vehicle) is approaching the host vehicle from behind.
Figure 4B:
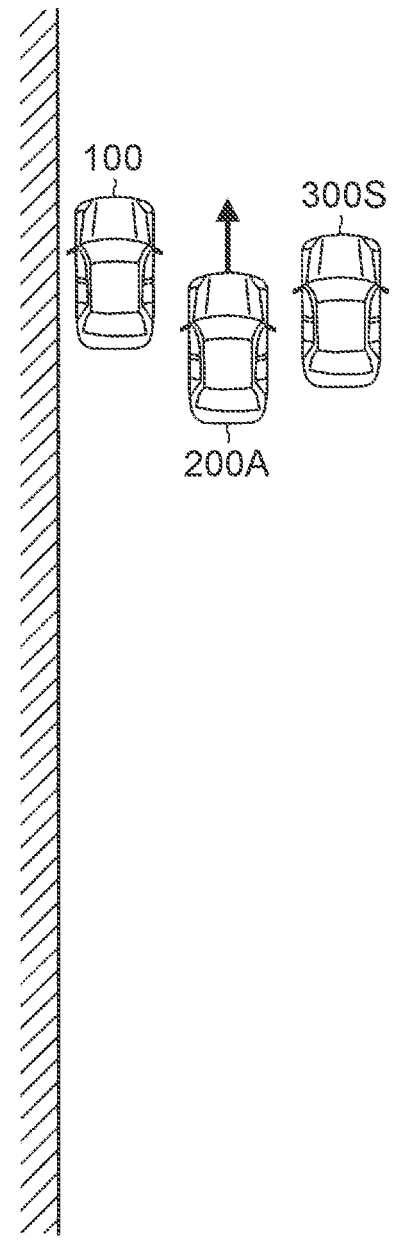
FIG. 4B illustrates a scene in which the approaching vehicle is passing between the stationary vehicle and the host vehicle.

As illustrated in FIG. 4A, meanwhile, there is occasionally a vehicle 300 that is stationary at a side of the host vehicle 100. When there is a vehicle 300 (stationary vehicle 300S) that is stationary at a side of the host vehicle 100, as illustrated in FIG. 4B, the approaching vehicle 200A occasionally passes between the stationary vehicle 300S and the host vehicle 100, and the approaching vehicle 200A passes by the host vehicle 100 at that time. Thus, if an alarm is issued in this case, the alarm is necessary to suppress the possibility of a collision between the approaching vehicle 200A and the door 100D of the host vehicle 100.

However, if the approaching vehicle 200A is moving as overlapping the stationary vehicle 300S in the transverse direction Y as illustrated in FIG. 5A, the approaching vehicle 200A will be stopped before the stationary vehicle 300S as illustrated in FIG. 5B. Thus, if an alarm is issued in this case, the alarm is not necessary to suppress the possibility of a collision between the approaching vehicle 200A and the door 100D of the host vehicle 100, and the issuance of such an alarm should be avoided.

Thus, the drop-off assist device 10 determines whether to issue an alarm as follows.

Figure 6A:
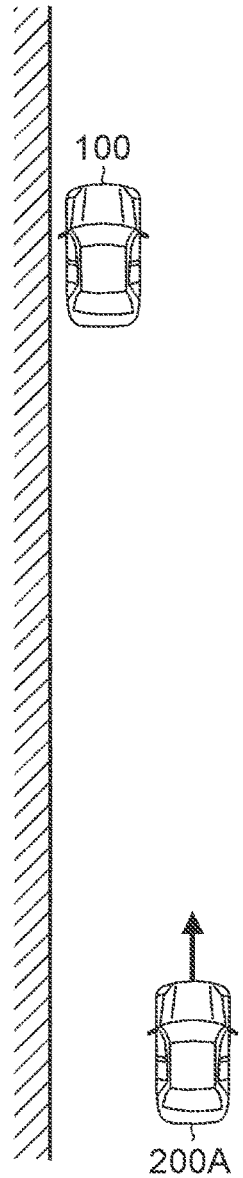
FIG. 6A illustrates a scene in which a vehicle (approaching vehicle) that is approaching the host vehicle from behind is detected.

The drop-off assist device 10 performs a process of detecting an approaching vehicle 200A based on the peripheral information I_S. When a vehicle 200 is approaching the host vehicle 100 as illustrated in FIG. 6A, the drop-off assist device 10 detects the vehicle 200 as an approaching vehicle 200A based on the peripheral information I_S.

When an approaching vehicle 200A is detected, the drop-off assist device 10 acquires a relative position P200 of the approaching vehicle 200A, a longitudinal distance D2_X to the approaching vehicle 200A, a relative speed dV of the approaching vehicle 200A, and a traveling direction D200 of the approaching vehicle 200A based on radio-wave information I_R.

Figure 6B:
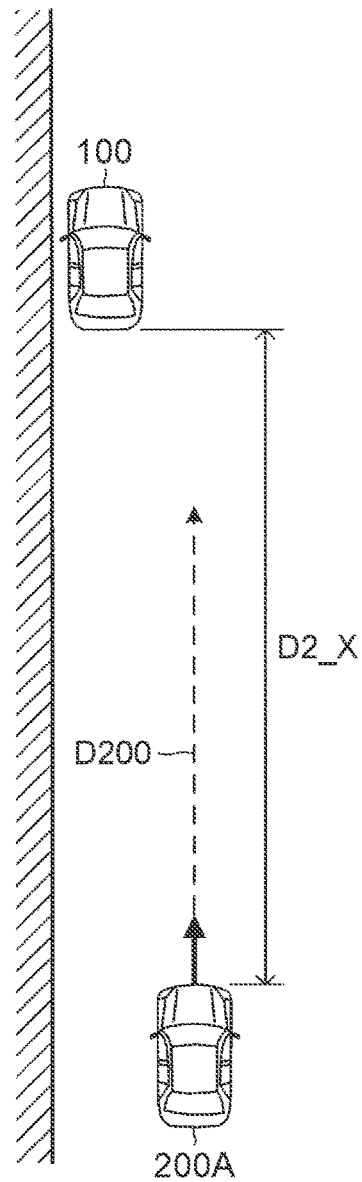
FIG. 6B illustrates the traveling direction of the approaching vehicle and the distance in the longitudinal direction between the approaching vehicle and the host vehicle.

The relative position P200 of the approaching vehicle 200A is the position of the approaching vehicle 200A relative to the host vehicle 100. The longitudinal distance D2_X to the approaching vehicle 200A is the distance from the host vehicle 100 to the approaching vehicle 200A in the longitudinal direction X as illustrated in FIG. 6B. The relative speed dV of the approaching vehicle 200A is the speed of the approaching vehicle 200A relative to the host vehicle 100. The traveling direction D200 of the approaching vehicle 200A is the traveling direction of the approaching vehicle 200A relative to the host vehicle 100 as illustrated in FIG. 6B.

The drop-off assist device 10 predicts a movement path of the approaching vehicle 200A based on the relative position P200, the traveling direction D200, etc. that have been acquired, and acquires the predicted movement path as a predicted movement path R200.

Figure 6C:
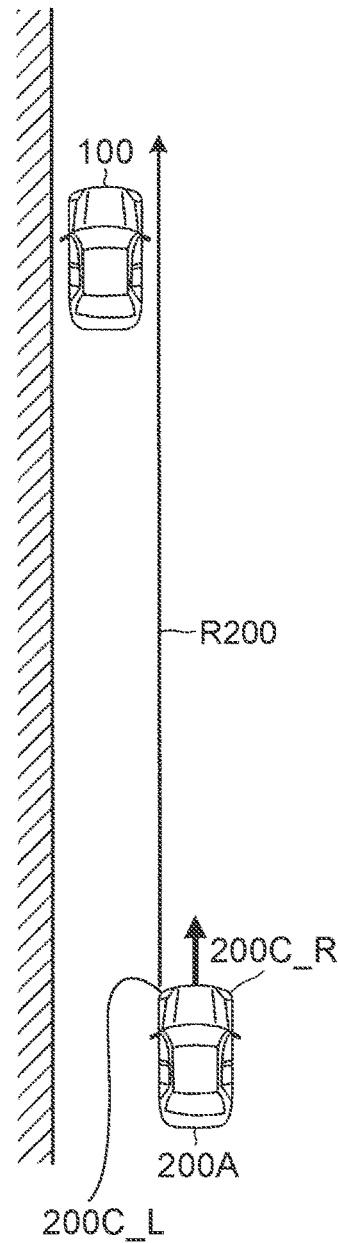
FIG. 6C illustrates a predicted movement path of a left front corner portion of the approaching vehicle.

In the present embodiment, as illustrated in FIG. 6C, the drop-off assist device 10 predicts a movement path of one (target portion P_T) of a right front corner portion 200C_R and a left front corner portion 200C_L of the approaching vehicle 200A that is closer to the host vehicle 100 in the transverse direction Y, and acquires the predicted movement path as a predicted movement path R200 of the approaching vehicle 200A. The drop-off assist device 10 acquires the predicted movement path R200 in predetermined computation cycles while the approaching vehicle 200A is detected.

The predicted movement path R200 is a path along which the target portion P_T is expected to move when it is assumed that the approaching vehicle 200A travels while keeping the traveling direction D200 at the time when such information is acquired. In the example illustrated in FIG. 6C, the approaching vehicle 200A is traveling on the right side of the host vehicle 100 in the transverse direction Y, and thus the target portion P_T corresponds to the left front corner portion 200C_L of the approaching vehicle 200A.

Figure 7:
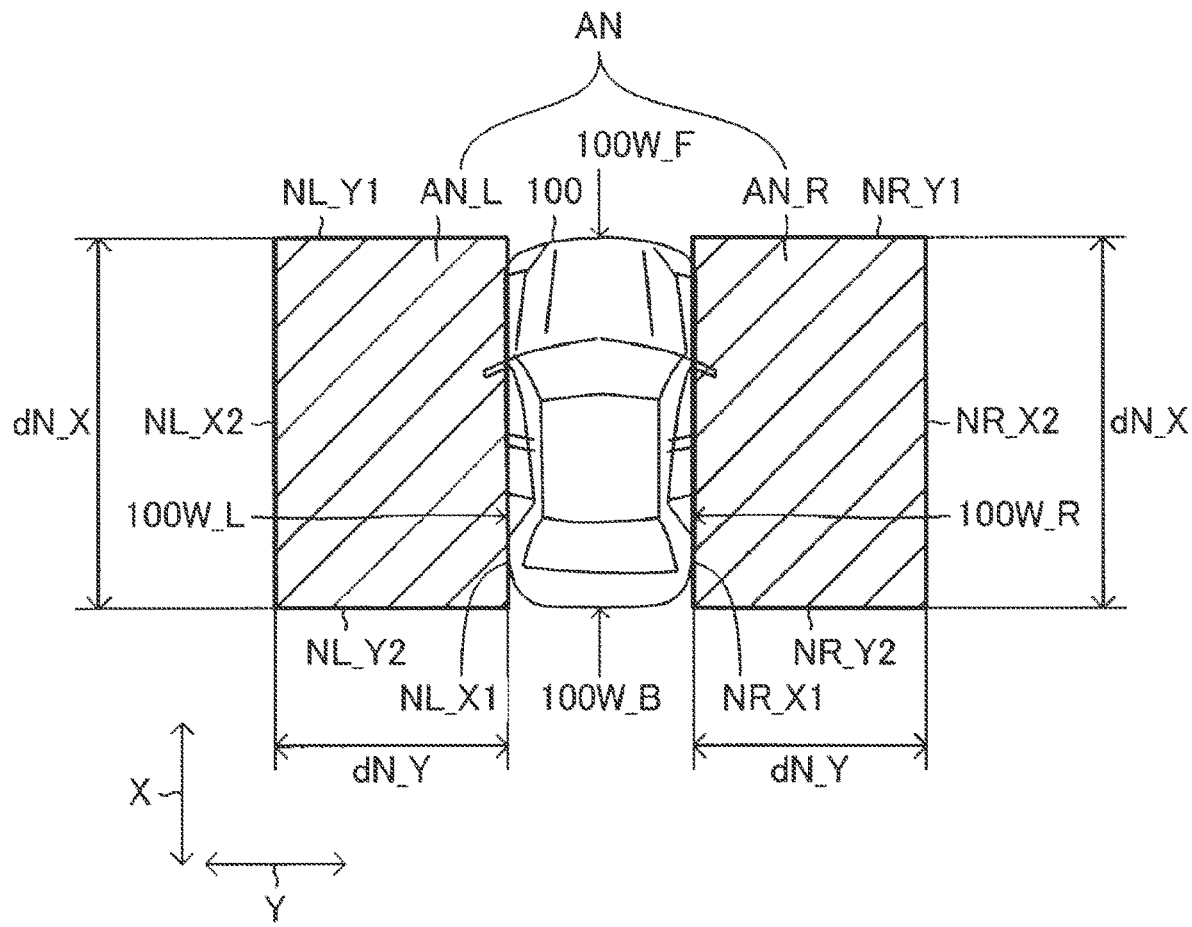
FIG. 7 illustrates proximate areas.

When a predicted movement path R200 is acquired, the drop-off assist device 10 determines based on the predicted movement path R200 whether the approaching vehicle 200A will pass by the door 100D of the host vehicle 100. In the present embodiment, the drop-off assist device 10 determines whether the approaching vehicle 200A will pass by the door 100D of the host vehicle 100, by determining whether the predicted movement path R200 intersects a proximate area AN when seen in plan. As illustrated in FIG. 7, the proximate area AN includes a right-side proximate area AN_R and a left-side proximate area AN_L.

Right-Side Proximate Area

The right-side proximate area AN_R is a rectangular area set on the right side of the host vehicle 100 and surrounded by two longitudinal lines (a longitudinal line NR_X1 and a longitudinal line NR_X2) and two transverse lines (a transverse line NR_Y1 and a transverse line NR_Y2).

The longitudinal line NR_X1 is a line that extends in the longitudinal direction X along a right-side wall 100W_R of the host vehicle 100. The longitudinal line NR_X2 is a line that extends in the longitudinal direction X a predetermined distance dN_Y to the right from the longitudinal line NR_X1 (i.e. the right-side wall 100W_R of the host vehicle 100). Thus, the length of the right-side proximate area AN_R in the transverse direction Y is a length corresponding to the predetermined distance dN_Y.

The transverse line NR_Y1 is a line that extends in the transverse direction Y along a front wall 100W_F of the host vehicle 100. The transverse line NR_Y2 is a line that extends in the transverse direction Y along a rear wall 100W_B of the host vehicle 100. In the present embodiment, the length of the right-side proximate area AN_R in the longitudinal direction X is a length dN_X.

Left-Side Proximate Area

The left-side proximate area AN_L is a rectangular area set on the left side of the host vehicle 100 and surrounded by two longitudinal lines (a longitudinal line NL_X1 and a longitudinal line NL_X2) and two transverse lines (a transverse line NL_Y1 and a transverse line NL_Y2).

The longitudinal line NL_X1 is a line that extends in the longitudinal direction X along a left-side wall 100W_L of the host vehicle 100. The longitudinal line NL_X2 is a line that extends in the longitudinal direction X the predetermined distance dN_Y to the left from the longitudinal line NL_X1 (i.e. the left-side wall 100W_L of the host vehicle 100). Thus, the length of the left-side proximate area AN_L in the transverse direction Y is a length corresponding to the predetermined distance dN_Y.

The transverse line NL_Y1 is a line that extends in the transverse direction Y along the front wall 100W_F of the host vehicle 100. The transverse line NL_Y2 is a line that extends in the transverse direction Y along the rear wall 100W_B of the host vehicle 100. In the present embodiment, the length of the left-side proximate area AN_L in the longitudinal direction X is the length dN_X.

Proximate Line

Figure 8:
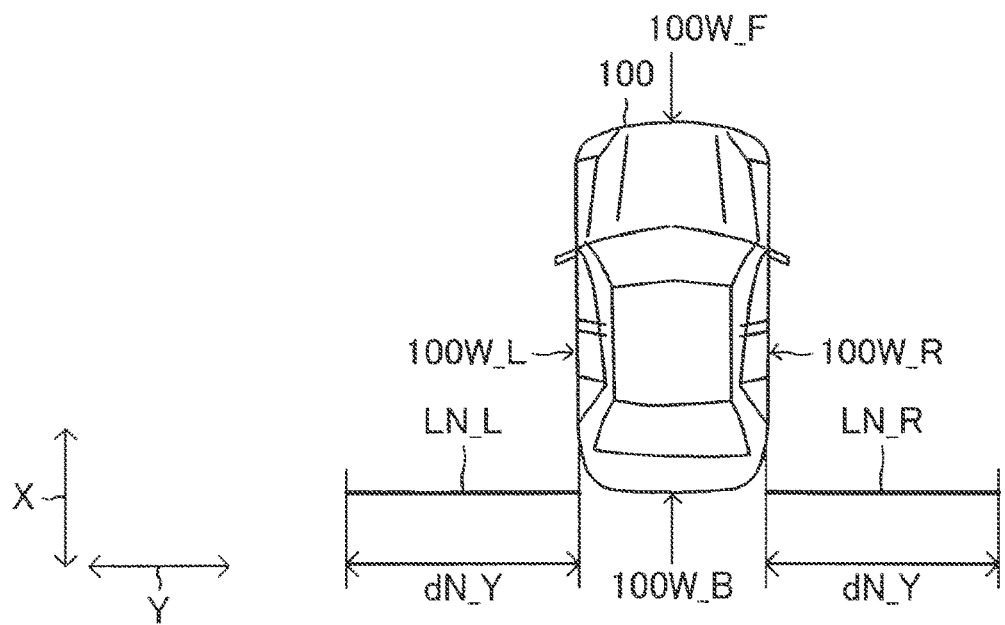
FIG. 8 illustrates proximate lines as the proximate areas.

In the present embodiment, as illustrated in FIG. 8, a right-side proximate line LN_R is used for the right-side proximate area AN_R, and a left-side proximate line LN_L is used for the left-side proximate area AN_L.

The right-side proximate line LN_R is a line that extends from the right-side wall 100W_R of the host vehicle 100 to a point the predetermined distance dN_Y to the right. In other words, the right-side proximate line LN_R corresponds to an area within the predetermined distance dN_Y from the host vehicle 100 in the transverse direction Y. The left-side proximate line LN_L is a line that extends from the left-side wall 100W_L of the host vehicle 100 to a point the predetermined distance dN_Y to the left. In other words, the left-side proximate line LN_L corresponds to an area within the predetermined distance dN_Y from the host vehicle 100 in the transverse direction Y.

The predetermined distance dN_Y is set to at least a distance that is equal to or more than the distance (minimum distance Dm) between a point reached by the distal end of the right-side door 100D_R of the host vehicle 100 when the right-side door 100D_R is fully opened and the right-side wall 100W_R of the host vehicle 100. The predetermined distance dN_Y is set to at least a distance that is equal to or more than the distance (minimum distance Dm) between a point reached by the distal end of the left-side door 100D_L of the host vehicle 100 when the left-side door 100D_L is fully opened and the left-side wall 100W_L of the host vehicle 100.

In the present embodiment, the predetermined distance dN_Y is set to a distance that is longer than the minimum distance Dm, in order to ensure safety, in consideration of the possibility that an occupant of the host vehicle 100 moves transversely further beyond the distal end portion of the door 100D, which has been opened, when the occupant opens the door 100D and gets off the host vehicle 100, the possibility that the approaching vehicle 200A comes closer to the host vehicle 100 in the transverse direction Y even if the predicted movement path R200 is away from the host vehicle 100 by a distance that is longer than the minimum distance Dm when the approaching vehicle 200A is traveling at a location relatively far behind the host vehicle 100, the difficulty in acquiring a significantly accurate predicted movement path R200, etc.

When an approaching vehicle 200A is detected, in addition, the drop-off assist device 10 acquires a predicted arrival time, which is a time predicted to be taken for the approaching vehicle 200A to reach the door 100D of the host vehicle 100, based on the peripheral information I_S. In the present embodiment, the drop-off assist device 10 acquires a predicted arrival time TTC predicted to be taken for the approaching vehicle 200A to reach the host vehicle 100, as the predicted arrival time predicted to be taken for the approaching vehicle 200A to reach the door 100D of the host vehicle 100.

The drop-off assist device 10 acquires the predicted arrival time TTC through computation based on the longitudinal distance D2_X and the relative speed dV. In the present embodiment, the drop-off assist device 10 acquires the predicted arrival time TTC by dividing the longitudinal distance D2_X by the relative speed dV (TTC=D2_X/dV). The drop-off assist device 10 acquires the predicted arrival time TTC in predetermined computation cycles while the approaching vehicle 200A is detected.

When an approaching vehicle 200A is detected, further, the drop-off assist device 10 determines based on the peripheral information I_S whether there is any vehicle that is stationary in the adjacent area AS. The drop-off assist device 10 determines whether there is any vehicle that is stationary in the adjacent area AS in predetermined computation cycles while the approaching vehicle 200A is detected.

Adjacent Area

Figure 9:
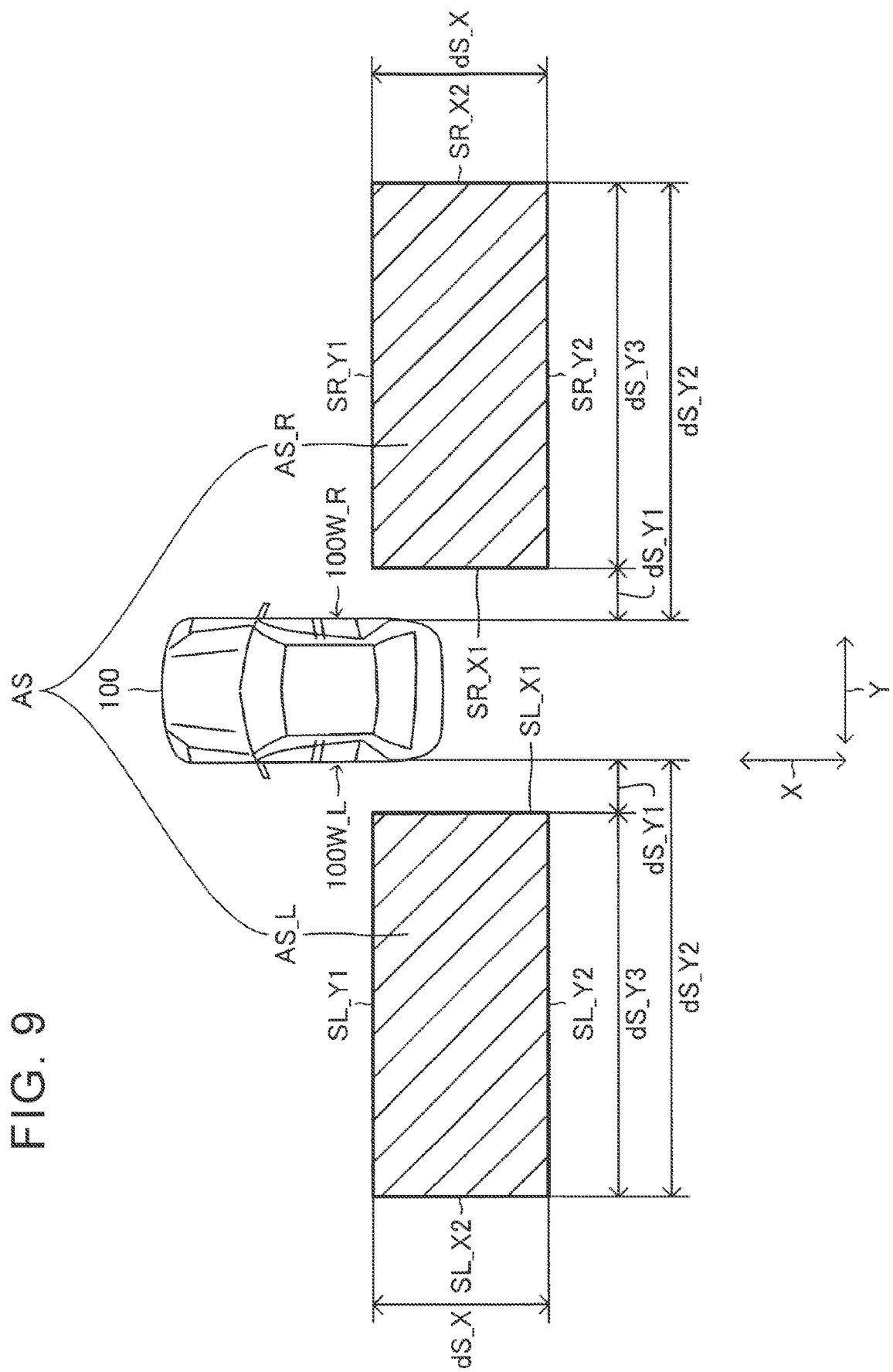
FIG. 9 illustrates adjacent areas.

As illustrated in FIG. 9, the adjacent area AS includes a right-side adjacent area AS_R and a left-side adjacent area AS_L.

Right-Side Adjacent Area

In the present embodiment, the right-side adjacent area AS_R is a rectangular area set on the right side of the host vehicle 100 and surrounded by two longitudinal lines (a longitudinal line SR_X1 and a longitudinal line SR_X2) and two transverse lines (a transverse line SR_Y1 and a transverse line SR_Y2).

The longitudinal line SR_X1 is a line that extends in the longitudinal direction X a first distance dS_Y1 to the right from the right-side wall 100W_R of the host vehicle 100. The longitudinal line SR_X2 is a line that extends in the longitudinal direction X a second distance dS_Y2 to the right from the right-side wall 100W_R of the host vehicle 100. The second distance dS_Y2 is longer than the first distance dS_Y1 by a predetermined length dS_Y3. Thus, the length of the right-side adjacent area AS_R in the transverse direction Y is the predetermined length dS_Y3.

The transverse line SR_Y1 is a line that extends in the transverse direction Y and that passes through the rear end of the right rear door 100D_RR of the host vehicle 100. The transverse line SR_Y2 is a line that extends in the transverse direction Y a predetermined distance dS_X behind the transverse line SR_Y1. Thus, the length of the right-side adjacent area AS_R in the longitudinal direction X is a length corresponding to the predetermined distance dS_X.

Left-Side Adjacent Area

In the present embodiment, the left-side adjacent area AS_L is a rectangular area set on the left side of the host vehicle 100 and surrounded by two longitudinal lines (a longitudinal line SL_X1 and a longitudinal line SL_X2) and two transverse lines (a transverse line SL_Y1 and a transverse line SL_Y2).

The longitudinal line SL_X1 is a line that extends in the longitudinal direction X the first distance dS_Y1 to the left from the left-side wall 100W_L of the host vehicle 100. The longitudinal line SL_X2 is a line that extends in the longitudinal direction X the second distance dS_Y2 to the left from the left-side wall 100W_L of the host vehicle 100. As discussed earlier, the second distance dS_Y2 is longer than the first distance dS_Y1 by the predetermined length dS_Y3. Thus, the length of the left-side adjacent area AS_L in the transverse direction Y is the predetermined length dS_Y3.

The transverse line SL_Y1 is a line that extends in the transverse direction Y and that passes through the rear end of the left rear door 100D_LR of the host vehicle 100. The transverse line SL_Y2 is a line that extends in the transverse direction Y the predetermined distance dS_X behind the transverse line SL_Y1. Thus, the length of the left-side adjacent area AS_L in the longitudinal direction X is a length corresponding to the predetermined distance dS_X.

Figure 10:
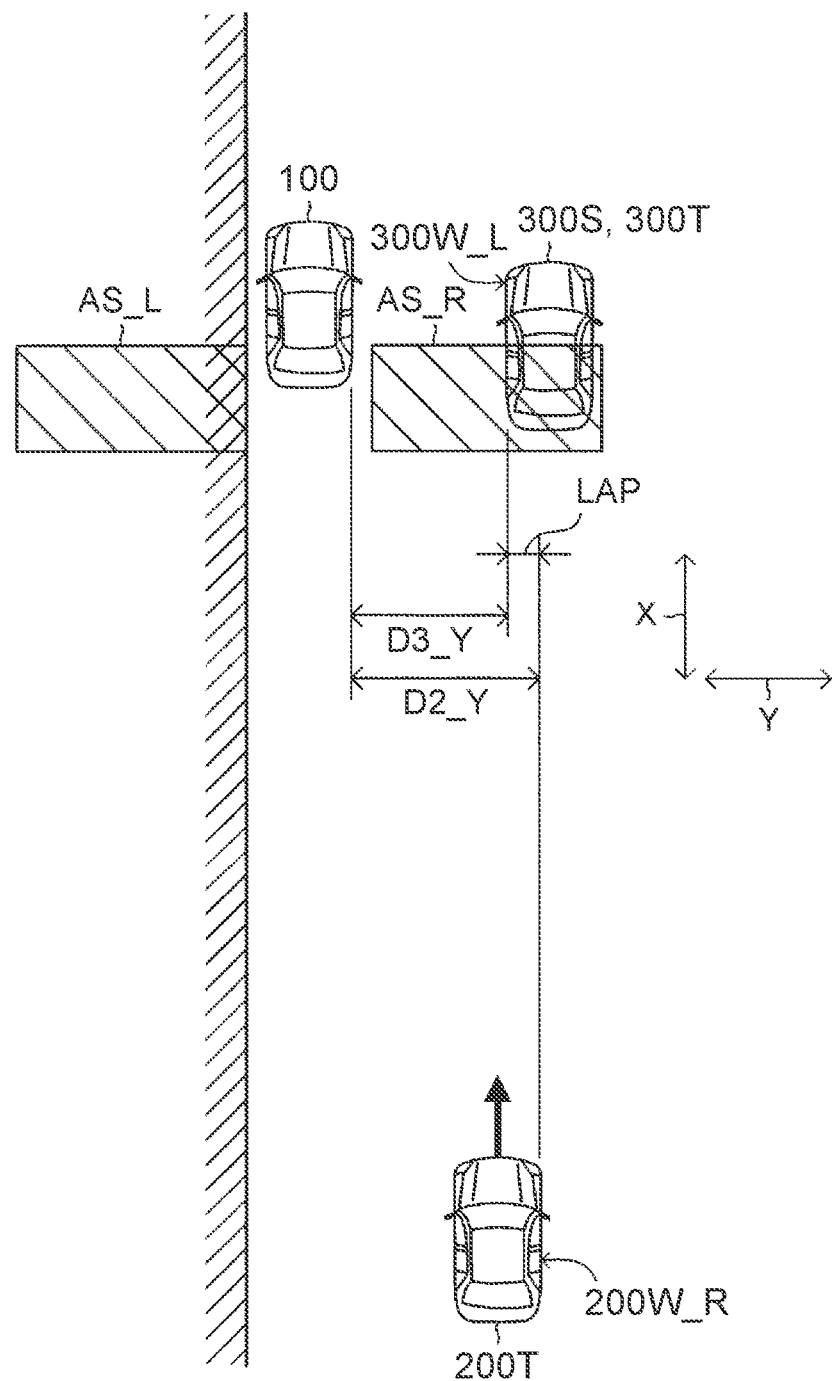
FIG. 10 illustrates a scene in which a vehicle (stationary vehicle) is present and stationary in an adjacent area.

When a stationary vehicle 300S is present in the adjacent area AS as illustrated in FIG. 10, the drop-off assist device 10 detects the vehicle 300 as a target stationary vehicle 300T.

When a target stationary vehicle 300T is detected, the drop-off assist device 10 acquires a stationary vehicle distance D3_Y and an approaching vehicle distance D2_Y based on the peripheral information I_S.

The stationary vehicle distance D3_Y is the distance in the transverse direction Y between the host vehicle 100 and the target stationary vehicle 300T. In the present embodiment, the stationary vehicle distance D3_Y is the distance between a "portion of the host vehicle 100 on the side closer to the target stationary vehicle 300T in the transverse direction Y" and a "portion of the target stationary vehicle 300T on the side closer to the host vehicle 100 in the transverse direction Y". In the example illustrated in FIG. 10, the stationary vehicle distance D3_Y is the distance between the right-side wall 100W_R of the host vehicle 100 and a left-side wall 300W_L of the target stationary vehicle 300T.

The approaching vehicle distance D2_Y is the distance in the transverse direction Y between the host vehicle 100 and the approaching vehicle 200A. In the present embodiment, the approaching vehicle distance D2_Y is the distance between a "portion of the host vehicle 100 on the side closer to the approaching vehicle 200A in the transverse direction Y" and a "portion of the approaching vehicle 200A on the side farther from the host vehicle 100 in the transverse direction Y". In the example illustrated in FIG. 10, the approaching vehicle distance D2_Y is the distance between the right-side wall 100W_R of the host vehicle 100 and a right-side wall 200W_R of the approaching vehicle 200A.

When the stationary vehicle distance D3_Y and the approaching vehicle distance D2_Y are acquired, the drop-off assist device 10 acquires the difference (lap amount LAP) between the stationary vehicle distance D3_Y and the approaching vehicle distance D2_Y. In the present embodiment, the lap amount LAP is acquired by subtracting the stationary vehicle distance D3_Y from the approaching vehicle distance D2_Y (LAP=D2_Y−D3_Y). Thus, the acquired lap amount LAP has a positive value when the approaching vehicle 200A and the target stationary vehicle 300T overlap each other in the transverse direction Y, and the acquired lap amount LAP has a negative value when the approaching vehicle 200A and the target stationary vehicle 300T do not overlap each other in the transverse direction Y.

Satisfaction of Alarming Condition

Figure 11A:
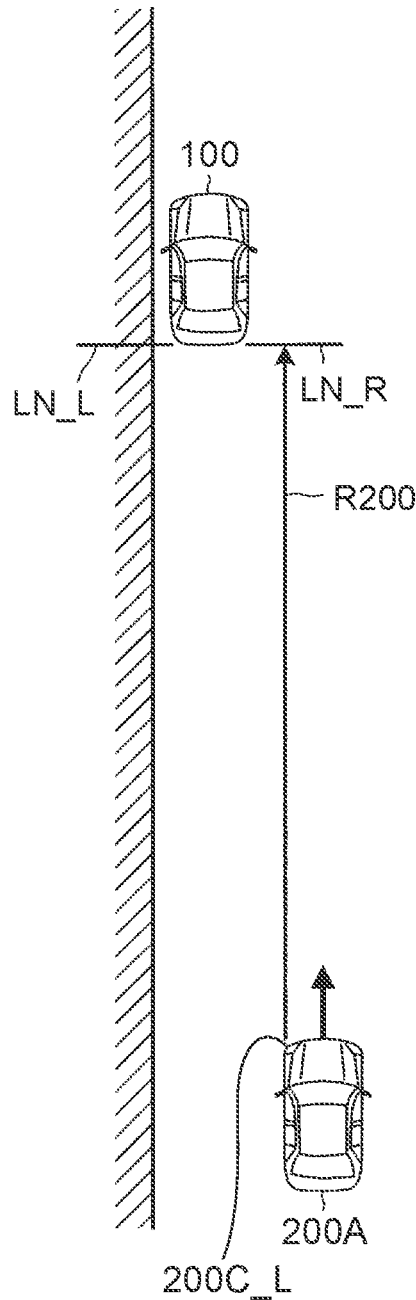
FIG. 11A illustrates a scene in which a vehicle (approaching vehicle) that is approaching the host vehicle from behind is moving at a location relatively far behind the host vehicle.
Figure 11B:
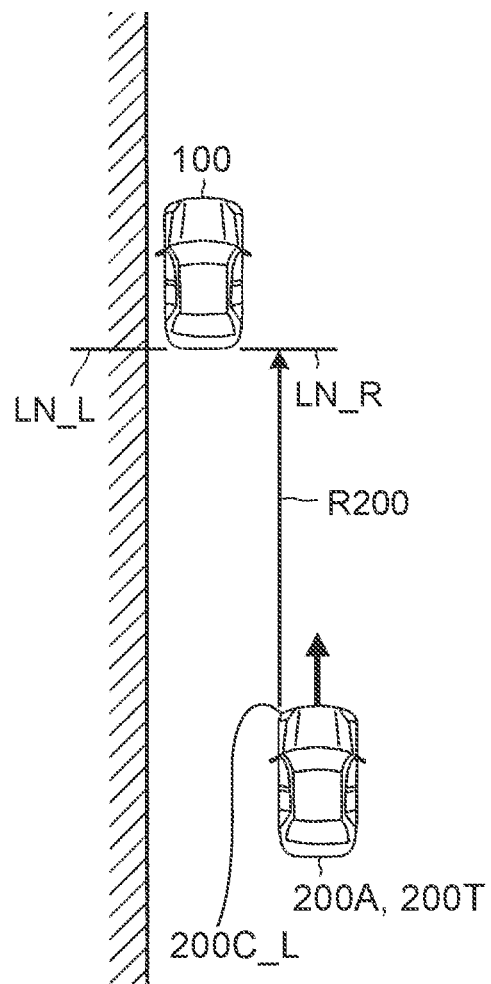
FIG. 11B illustrates a scene in which the approaching vehicle has come close to the host vehicle.

The drop-off assist device 10 may determine that a movement path condition C_R is met when the predicted movement path R200 intersects the proximate area AN, as illustrated in FIG. 11A, irrespective of the predicted arrival time TTC. In the present embodiment, however, as illustrated in FIG. 11B, the drop-off assist device 10 determines that the movement path condition C_R is met when the predicted movement path R200 intersects the proximate area AN when the approaching vehicle 200A has come close to the host vehicle 100 and the predicted arrival time TTC has become as short as a predetermined predicted arrival time TTC_T, or when the predicted movement path R200 intersects the proximate area AN when the predicted arrival time TTC is equal to or less than the predetermined predicted arrival time TTC_T.

When it is determined that the movement path condition C_R is met, the drop-off assist device 10 sets the approaching vehicle 200A, for which the movement path condition C_R is met, as a target approaching vehicle 200T.

When the movement path condition C_R is met, the drop-off assist device 10 determines whether the lap amount LAP is equal to or more than a predetermined lap amount LAP_T.

When the lap amount LAP is equal to or more than the predetermined lap amount LAP_T, as illustrated in FIG.

12A, the drop-off assist device 10 determines that the target approaching vehicle 200T may be stopped before the target stationary vehicle 300T, and determines that a prohibition condition C_S is met.

In other words, the drop-off assist device 10 determines that the target approaching vehicle 200T may be stopped before the target stationary vehicle 300T, and determines that the prohibition condition C_S is met, when the target stationary vehicle 300T, which is a vehicle that is stationary at a side of the host vehicle 100, is present when the movement path condition C_R is met and the difference between the "distance in the transverse direction Y from the host vehicle 100 to the target stationary vehicle 300T" and the "distance in the transverse direction Y from the host vehicle 100 to the target approaching vehicle 200T" is equal to or less than a predetermined value.

Figure 12A:
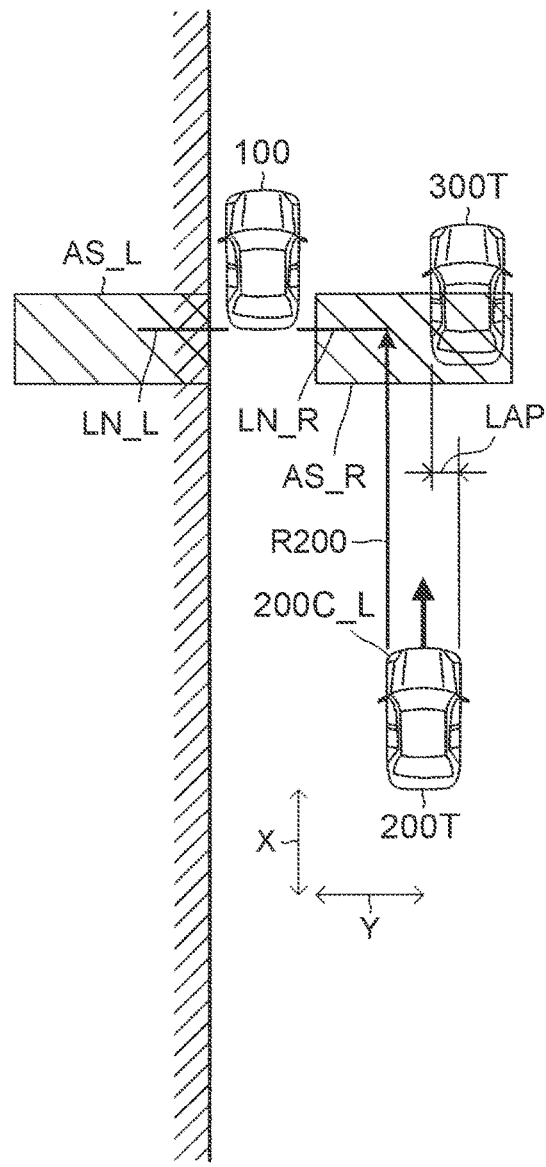
FIG. 12A illustrates a scene in which a vehicle (approaching vehicle) that is approaching the host vehicle from behind and a vehicle (stationary vehicle) that is present and stationary at a side of the host vehicle significantly overlap each other in the transverse direction.
Figure 12B:
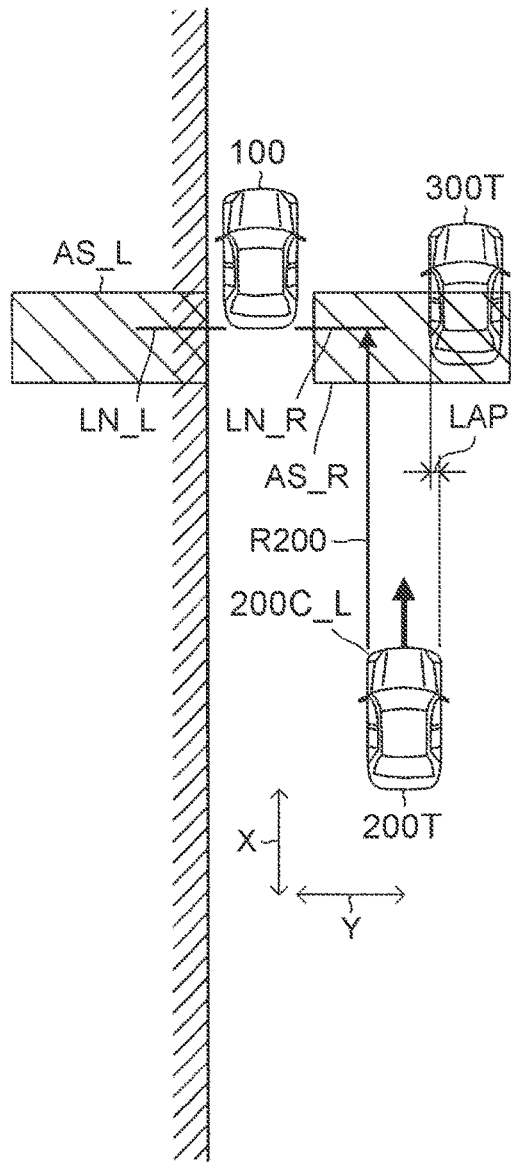
FIG. 12B illustrates a scene in which the approaching vehicle and the stationary vehicle slightly overlap each other in the transverse direction.

On the other hand, when the lap amount LAP is smaller than the predetermined lap amount LAP_T, as illustrated in FIG. 12B, the drop-off assist device 10 determines that the target approaching vehicle 200T may pass between the target stationary vehicle 300T and the host vehicle 100, and determines that the prohibition condition C_S is not met.

In other words, the drop-off assist device 10 does not determine that the target approaching vehicle 200T may be stopped before the target stationary vehicle 300T, and thus does not determine that the prohibition condition C_S is met, when the target stationary vehicle 300T, which is a vehicle that is stationary at a side of the host vehicle 100, is present when the movement path condition C_R is met and the difference between the "distance in the transverse direction Y from the host vehicle 100 to the target stationary vehicle 300T" and the "distance in the transverse direction Y from the host vehicle 100 to the target approaching vehicle 200T" is more than the predetermined value.

If the target approaching vehicle 200T and the target stationary vehicle 300T overlap each other, even if only slightly, in the transverse direction Y, the target approaching vehicle 200T should be stopped before the target stationary vehicle 300T when the target approaching vehicle 200T comes close to the target stationary vehicle 300T, irrespective of how much the vehicles overlap each other, and thus the predetermined lap amount LAP_T may be set to zero. In the present embodiment, however, the predetermined lap amount LAP_T is set to an amount that is larger than zero, in order to ensure safety, in consideration of the possibility that the target approaching vehicle 200T comes close to the host vehicle 100 in the transverse direction Y and does not overlap the target stationary vehicle 300T in the transverse direction Y even if the target approaching vehicle 200T overlaps the target stationary vehicle 300T in the transverse direction Y when the target approaching vehicle 200T is traveling at a location relatively far behind the host vehicle 100, the difficulty in acquiring a significantly accurate lap amount LAP, etc.

When the lap amount LAP has a negative value, it is determined that the lap amount LAP is smaller than the predetermined lap amount LAP_T.

When the prohibition condition C_S is not met when the movement path condition C_R is met, the drop-off assist device 10 determines that an alarming condition C_A is met, and issues an alarm.

When the prohibition condition C_S is met, on the other hand, the drop-off assist device 10 does not determine that the alarming condition C_A is met, even if the movement path condition C_R is met, and thus does not issue an alarm.

In the present embodiment, the drop-off assist device 10 determines that the alarming condition C_A is met when the prohibition condition C_S is not met when the movement path condition C_R is met. However, the drop-off assist device 10 may be configured to determine that the alarming condition C_A is met upon detecting an operation by an occupant of the host vehicle 100 to open the door 100D of the host vehicle 100 on the side on which the target approaching vehicle 200T is predicted to pass when the movement path condition C_R is met and the prohibition condition C_S is not met. The operation to open the door 100D of the host vehicle 100 may be an operation to unlock the door 100D, an operation to actually open the door 100D, etc.

With the drop-off assist device 10, an alarm is not issued when the target stationary vehicle 300T is present and the target approaching vehicle 200T may be stopped before the target stationary vehicle 300T, and thus unuseful issuance of an alarm can be suppressed.

Specific Operation of Drop-Off Assist Device

Next, specific operation of the drop-off assist device 10 will be described. The CPU of the ECU 90 of the drop-off assist device 10 executes the routine illustrated in FIG. 13 in predetermined time cycles.

Thus, when a predetermined timing comes, the CPU starts a process in step 1300 in FIG. 13, and proceeds to step 1305 to determine whether an approaching vehicle 200A is detected.

When "Yes" is determined in step 1305, the CPU proceeds to step 1310, and acquires a predicted movement path R200. Next, the CPU proceeds to step 1315, and acquires a predicted arrival time TTC. Next, the CPU proceeds to step 1320, and determines whether there is any stationary vehicle 300S.

When "Yes" is determined in step 1320, the CPU proceeds to step 1325, and acquires a lap amount LAP. At this time, the CPU sets the stationary vehicle 300S as a target stationary vehicle 300T. Next, the CPU proceeds to step 1330.

When "No" is determined in step 1320, on the other hand, the CPU directly proceeds to step 1330.

When the process proceeds to step 1330, the CPU determines whether the predicted movement path R200 intersects the right-side proximate line LN_R or the left-side proximate line LN_L.

When "Yes" is determined in step 1330, the CPU proceeds to step 1335, and determines whether the predicted arrival time TTC is equal to or less than the predetermined predicted arrival time TTC_T.

When "Yes" is determined in step 1335, the CPU proceeds to step 1340, and determines whether the lap amount LAP is equal to or more than the predetermined lap amount LAP_T. That is, the CPU determines whether the prohibition condition C_S is met.

When the process in step 1325 is not executed since "No" is determined in step 1320 and therefore the lap amount LAP is not acquired, the CPU determines in step 1335 that the lap amount LAP is less than the predetermined lap amount LAP_T (i.e. "No" is determined in step 1340).

When "Yes" is determined in step 1340, the CPU directly proceeds to step 1395, and temporarily ends the present routine. Thus, in this case, the alarming condition C_A is not met since the prohibition condition C_S is met, and thus an alarm is not issued.

When "No" is determined in step 1340, on the other hand, the CPU determines that the alarming condition C_A is met since the prohibition condition C_S is not met, and proceeds to step 1345 to issue an alarm. Next, the CPU proceeds to step 1395, and temporarily ends the present routine.

When "No" is determined in step 1305, step 1330, or step 1335, the CPU proceeds to step 1395, and temporarily ends the present routine. When an alarm is issued at this time, the CPU stops issuing the alarm.

Specific operation of the drop-off assist device 10 has been described above.

The present disclosure is not limited to the embodiment described above, and a variety of modifications can be adopted within the scope of the present disclosure.

What is claimed is:

1. A drop-off assist device comprising a processor configured to:
   issue an alarm when a movement path condition is met and a prohibition condition is not met, the movement path condition being met when an approaching object is present, the approaching object is an object that is approaching a host vehicle and of which a predicted movement path is a path along which the object passes by a door of the host vehicle; and
   not issue the alarm when the prohibition condition is met, even when the movement path condition is met, wherein
   the prohibition condition includes a condition to be met when a difference between a distance in a transverse direction from the host vehicle to a stationary object and a distance in the transverse direction from the host vehicle to the approaching object is equal to or less than a predetermined value in a case where the stationary object is present, the stationary object being stationary at a side of the host vehicle.

2. The drop-off assist device according to claim 1, wherein the processor is configured to detect, as the approaching object, the object that is approaching the host vehicle and of which the predicted movement path is a path along which the object passes through an area within a predetermined distance in the transverse direction from the host vehicle.

3. The drop-off assist device according to claim 1, wherein the processor is configured to detect, as the stationary object, an object that is stationary in a predetermined area at the side of the host vehicle.

4. The drop-off assist device according to claim 1, wherein the movement path condition includes a condition to be met when a time predicted to be taken before the approaching object passes by the door of the host vehicle is equal to or less than a predetermined time.

5. The drop-off assist device according to claim 2, wherein the predetermined distance is equal to or greater than a distance reached by an end of the door of the host vehicle when the door is fully opened.

6. The drop-off assist device according to claim 1, wherein the predetermined value corresponds with a predetermined amount of overlap in the transverse direction between the approaching vehicle and the stationary object.

* * * * *